May 28, 1940.  G. TAUSCHEK  2,202,359

TRANSFERRING OR REPRODUCING MACHINE

Filed Jan. 17, 1936  5 Sheets-Sheet 1

INVENTOR
Gustav Tauschek
BY
ATTORNEYS

May 28, 1940.  G. TAUSCHEK  2,202,359
TRANSFERRING OR REPRODUCING MACHINE
Filed Jan. 17, 1936     5 Sheets-Sheet 2
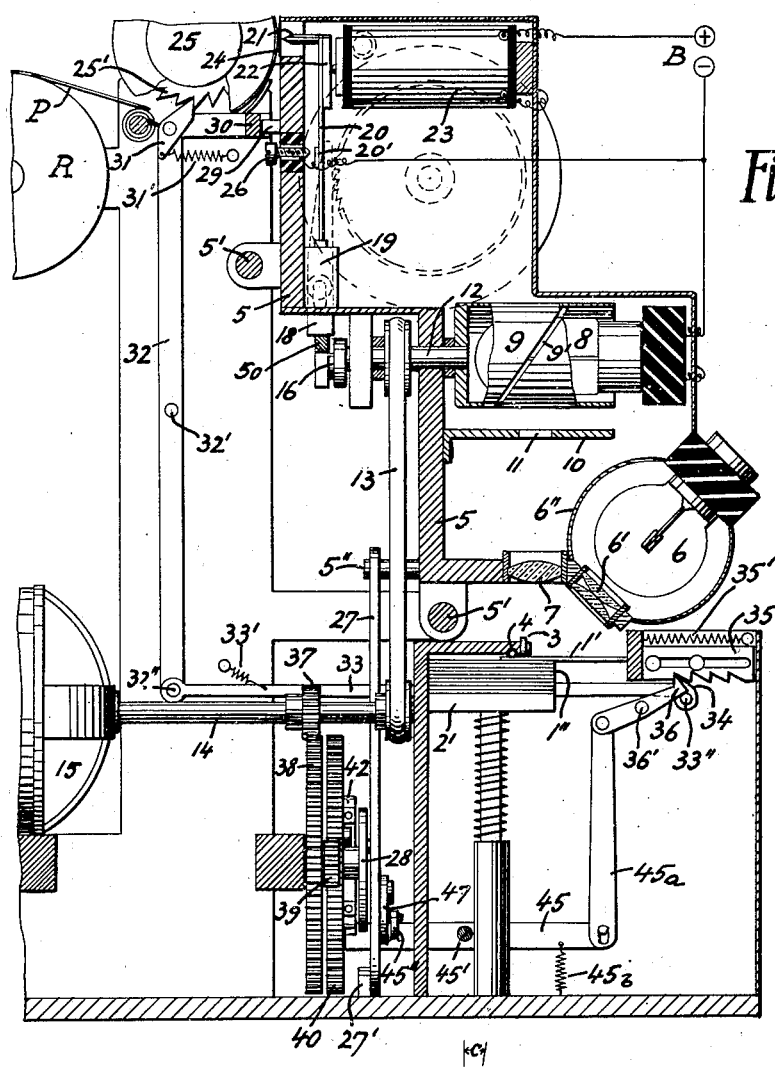
Fig. 2
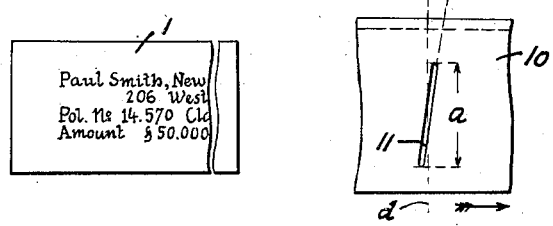
Fig. 5  Fig. 3  Fig. 6
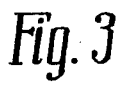
Fig. 4
INVENTOR
Gustav Tauschek
BY 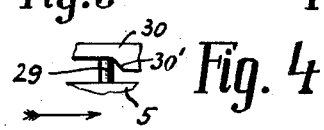
ATTORNEYS May 28, 1940.  G. TAUSCHEK  2,202,359
TRANSFERRING OR REPRODUCING MACHINE
Filed Jan. 17, 1936  5 Sheets-Sheet 3
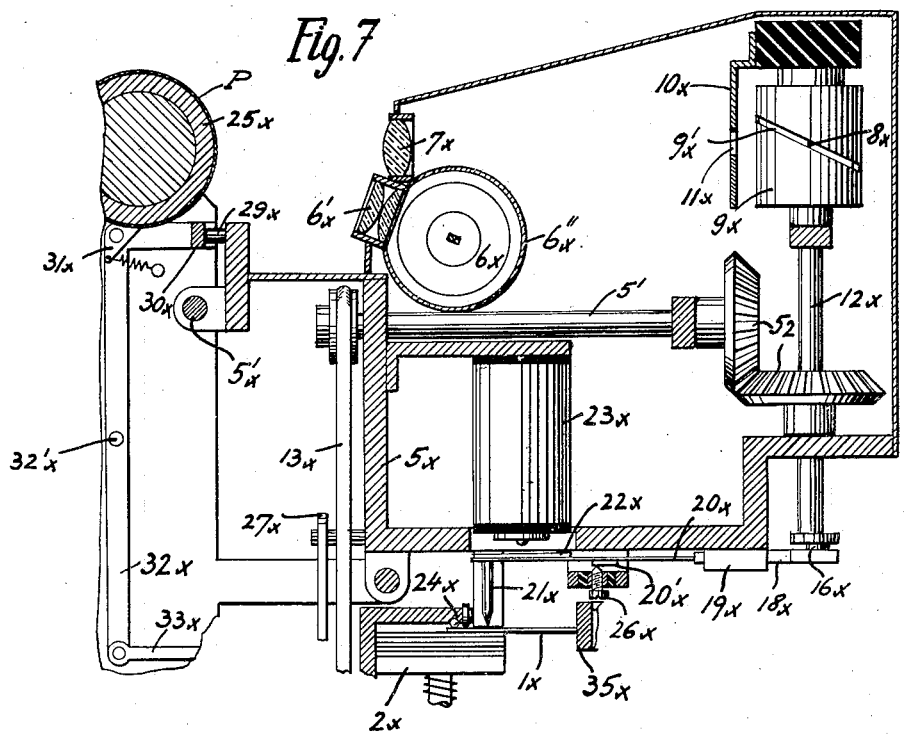
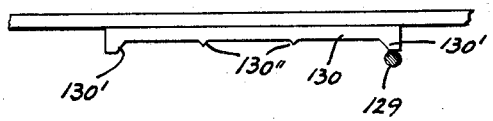
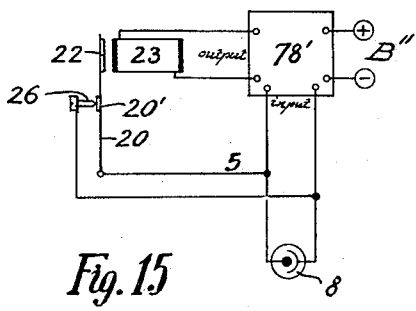
INVENTOR
Gustav Tauschek
BY Lotka & Kehlenbeck
ATTORNEYS

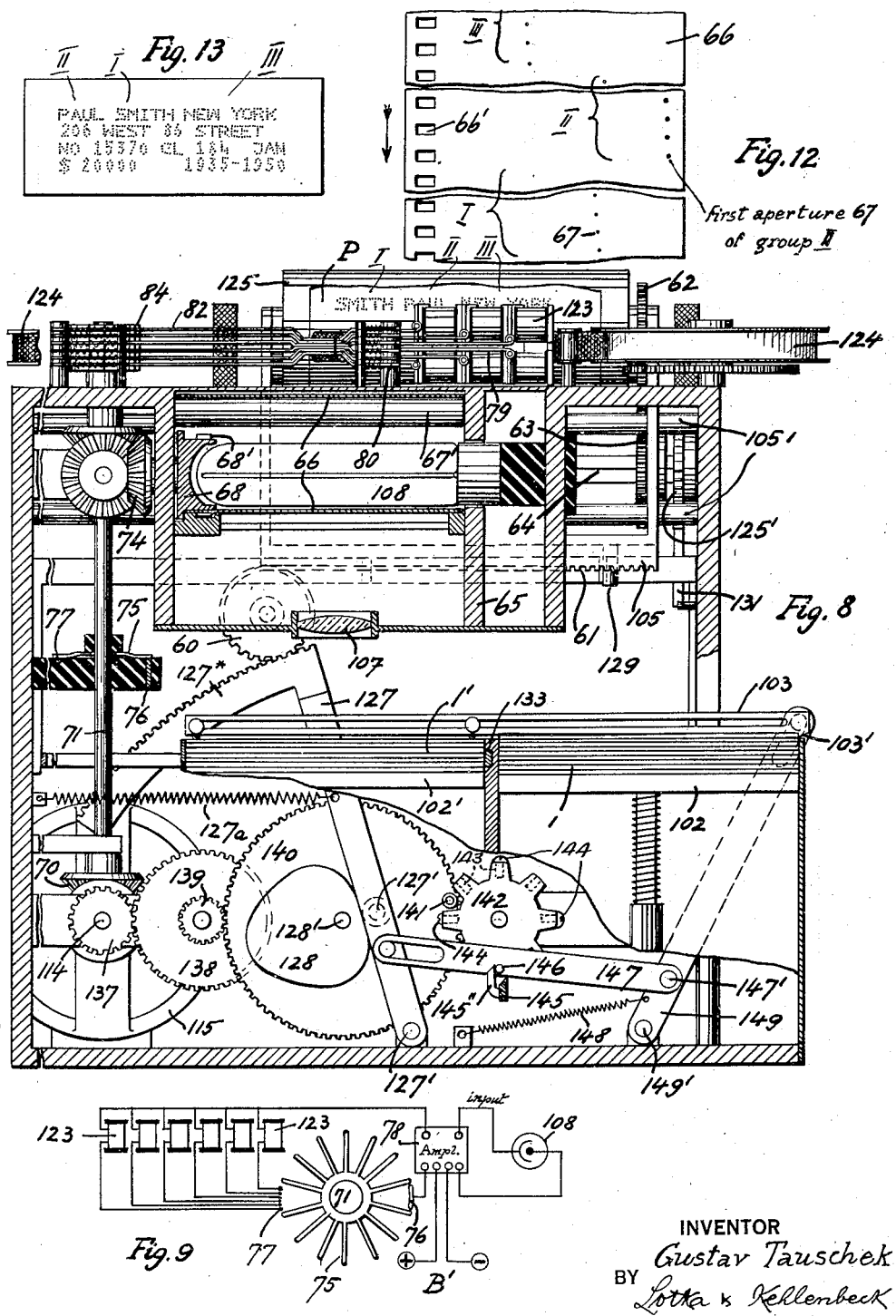

May 28, 1940.                G. TAUSCHEK                2,202,359
                TRANSFERRING OR REPRODUCING MACHINE
                Filed Jan. 17, 1936            5 Sheets-Sheet 5

INVENTOR
Gustav Tauschek
BY
Lotka & Kehlenbeck
ATTORNEYS

Patented May 28, 1940

2,202,359

UNITED STATES PATENT OFFICE 2,202,359

TRANSFERRING OR REPRODUCING MACHINE

Gustav Tauschek, New York, N. Y.

Application January 17, 1936, Serial No. 59,498
In Germany January 19, 1935

36 Claims. (Cl. 178—11)

My present invention relates to machines for transferring records or the like from cards or other record-carriers to a strip, sheet, or the like in tabular form, or from such a tabular record to individual record-carriers. The records may be of any suitable type, as long as they are of such character as to modify rays of radiant energy, such as for instance luminous rays.

In carrying out my invention, the indications on the record-carriers are scanned and transferred to, or reproduced upon, the tabulating strip, or vice-versa, with the aid of devices sensitive to radiant energy. If light is employed as such energy, these devices may consist, for instance, of photoelectric cells. The novel features of my invention will be explained below, and particularly pointed out in the appended claims.

Without intending to restrict myself to the particular embodiments illustrated, I will now describe three typical forms of my invention, as shown in the accompanying drawings, in which—

Figure 1:
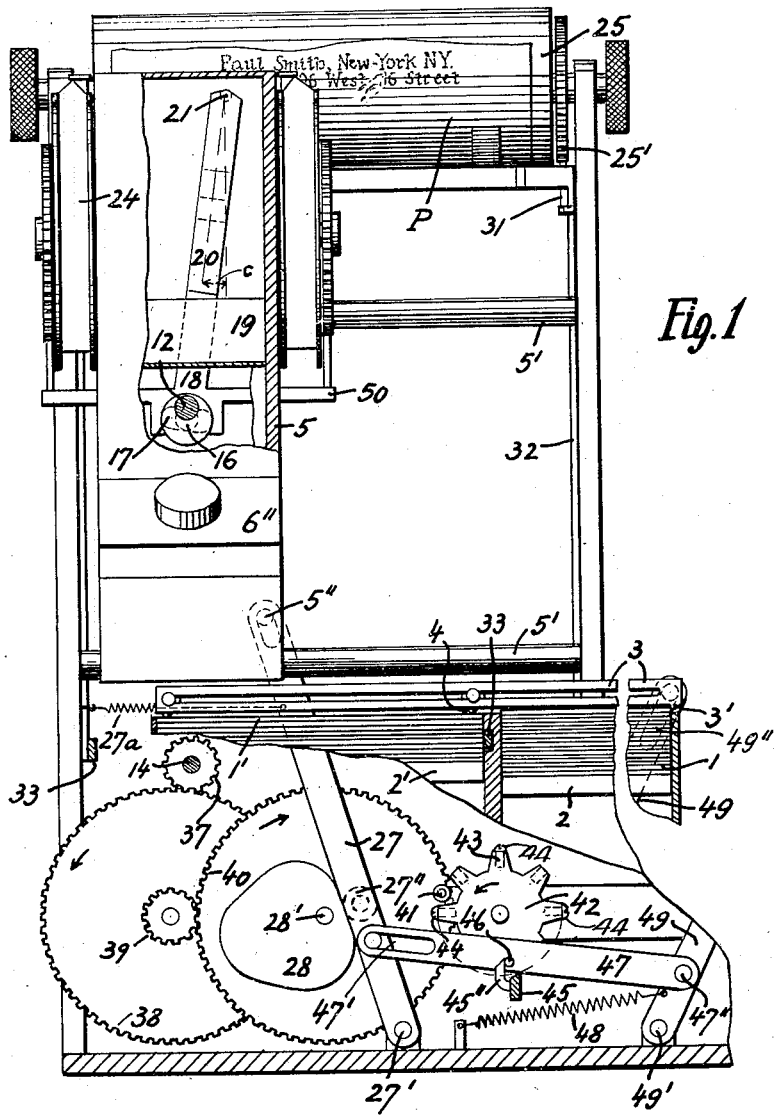
Figure 11:
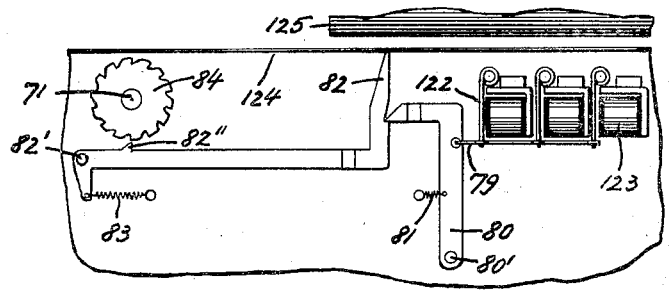
Figure 10:
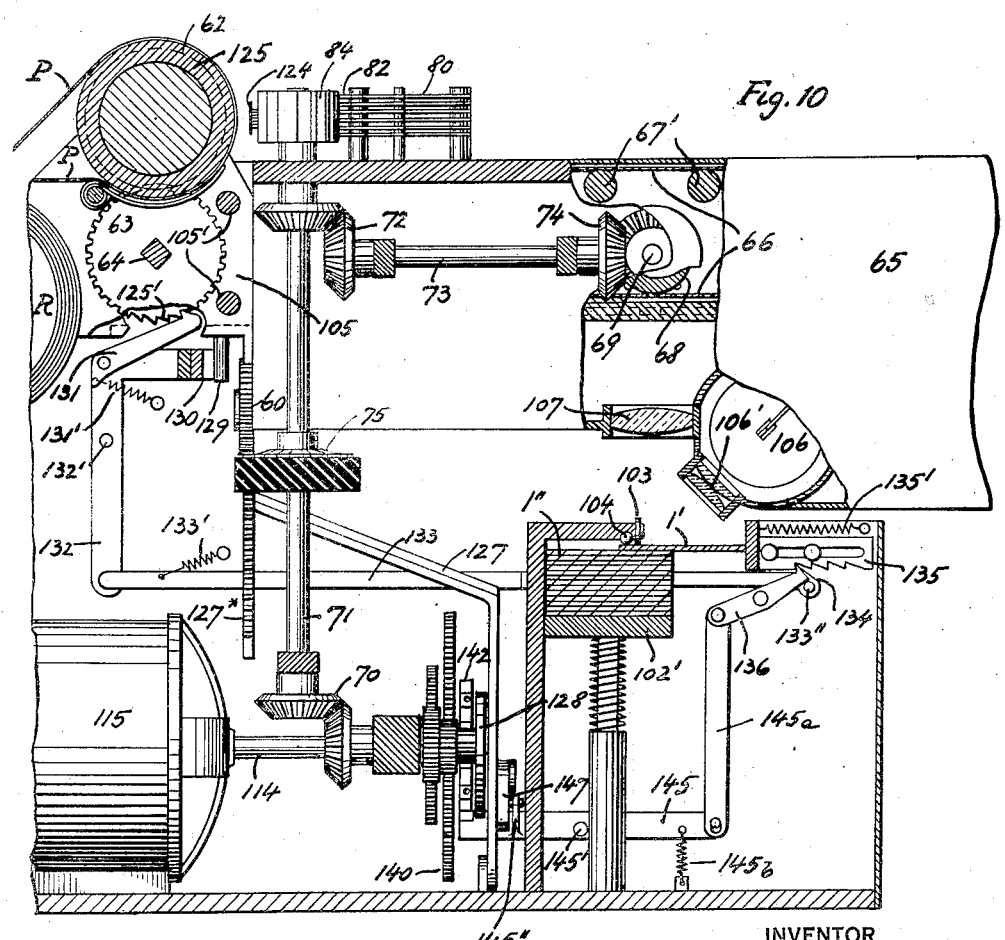

Fig. 1 is a front elevation of one example of my invention, with parts in section; Fig. 2 is a side elevation thereof, with parts in section; Figs. 3 and 4 are detail plan views of certain elements of the machine; Fig. 5 shows one of the record cards; Fig. 6 is a diagram showing, upon an enlarged scale, the reproduction of one of the letters forming part of the record represented in Fig. 5; Fig. 7 is a side elevation, with parts in section, of another machine embodying my invention; Fig. 8 is an elevation, with parts in section, showing a third embodiment of my invention; Fig. 9 is a diagram of the circuits employed in connection with this embodiment; Fig. 10 is an elevation, with parts in section, in a plane at right angles to Fig. 8; Fig. 11 is a plan view of certain parts shown in Figs. 8 and 10; Fig. 12 is a partial plan of a film or band employed in this embodiment; Fig. 13 is a face view of a card such as may constitute the original form which data are copied or reproduced in this embodiment; Fig. 14 is a detail plan view of two of the elements of such machine, one of said elements being shown in section; and Fig. 15 is another circuit diagram.

The machine shown in Figs. 1 to 4 is intended for copying or reproducing in tabular form, upon a single sheet or strip, data or records which are printed, written, or otherwise produced upon a plurality of individual record-carriers. These carriers may consist, for instance, of cards bearing names, addresses, and other particulars, as exemplified by the card 1 shown in Fig. 5. It is immaterial how the records are produced (typewritten, printed, manuscript records and others may be used), as long as they are adapted to modify the action of radiant energy; in the particular examples illustrated, the records will bear characters having light-modifying properties.

The record-carriers are shown stacked upon a suitable support indicated at 2; this support may be a plunger spring-pressed upwardly, as is common in machines in which cards are fed from a stack. The uppermost record-carrier or card 1 is engaged by a ledge or hook 3' at one end of a feed device 3 adapted to move the uppermost card from the stack shown at the right in Fig. 1 to the position illustrated at 1' in Figs. 1 and 2. This is the position in which the scanning and the copying or reproducing operation are performed with respect to the record contained on the uppermost card. In the position shown at the right in Fig. 1, the uppermost card is pressed against the feed device 3, but when transferred to the position shown at 1', such card is pressed against balls 4 or other suitable members on a stationary part of the machine, which balls limit the upward movement of the cards yet permit them to be moved lengthwise of the record lines from the position shown at 1 to the position shown at 1', and also transversely from the position shown at 1' to that shown at 1'', as will be set forth below. A spring-pressed member 2' urges the cards upwardly in positions 1' and 1''. A carriage 5 is movable along suitable stationary guides 5' in a direction parallel to the lines of the record on the card. Upon this carriage is mounted, preferably in an opaque cylindrically curved housing 6'', a suitable source of light 6 which illuminates the uppermost card 1' as indicated in Fig. 2, a lens system 6' being also indicated in said view. The light is directed chiefly against a particular portion or line of the record carrier or card. The light reflected from the white or otherwise reflecting portions of the card passes upwardly through a magnifying lens 7 also carried by the carriage 5 and reaches a photoelectric cell 8 which is fixed on said carriage. The said photoelectric cell 8 is surrounded by an opaque cylinder, sleeve or screen 9 having an oblique or elliptical window or slot 9' through which light may pass. Between the screen 9 and the lens or objective 7, a screen 10 having an oblique window or slot 11 is rigidly secured to the carriage 5. The screen 9 is rotatable around the photoelectric cell 8, said screen being secured to a horizontal shaft 12 journaled in the carriage 5 and receiving motion by means of a belt 13 and suitable pulleys, from a shaft 14 journaled on the machine frame and driven by a suitable motor 15, generally an electric motor. The belt 13 is made of rubber or other suitable longitudinally elastic material so that it may transmit motion properly from the shaft 14 to the shaft 12 notwithstanding the fact that during the motion of the carriage 5 the distance between said shafts varies.

The shaft 12 carries an eccentric 16 which projects into a slot 17 in a slide 18 arranged to reciprocate along an inclined path in a guide block 19 mounted on the carriage 5. The slot 17 is transverse, and preferably perpendicular, to the direction in which the slide 18 reciprocates. To the upper end of the slide 18 is secured a flat spring 20 carrying at its free end a writing point or stylus 21, as well as an armature 22 adapted to be attracted by an electromagnet 23 mounted on the carriage 5. The spring 20 tends to throw the writing point or stylus 21 toward a platen 25 which is journaled in the frame of the machine, a ribbon 24 of the character used in typewriters being interposed between the platen and the writing point. The paper strip or sheet P on which the record is to be copied is led to the platen 25 in any suitable manner, for instance from a supply roll R and after passing adjacent to the ink ribbon 24 leaves the platen and is disposed of in any suitable manner, for instance by winding it on a take-up roll (not shown).

The spring 20 also carries a contact 20' adapted to engage the point of a screw 26 which is supported on the carriage 5 but insulated therefrom, the body of said carriage being connected with one end of the coil of the electromagnet 23. The other end of said coil is connected with one terminal of a source of electricity, for instance a battery B, the other terminal of said source being connected with the screw 26 and with one terminal of the photoelectric cell 8 whose other terminal is connected with the conducting frame of the carriage 5. The vibrating spring 20 is also connected with the conducting carriage frame. When the magnet is energized the writing point 21 is pulled away from the platen 25, and when the attraction of the magnet is weakened, the spring 20 throws said writing point toward the platen, the relative arrangement of the parts being such that the contact 20' will engage the screw 26 before the writing point performs an impression on the paper carried by the platen. The writing point or stylus 21 constitutes a marking device. The battery or other source of electricity may be omitted in the event that the photoelectric cell 8 is of the type which generates an electric current under the influence of light.

The carriage 5 is moved along the guides 5' by means of a lever 27 fulcrumed on the machine frame at 27' and provided at its upper end with a longitudinal slot into which projects a pin 5" on the carriage. The lever 27 also carries a roller 27" in engagement with the periphery of a cam 28 carried by a shaft 28' journaled in the machine frame. A spring 27a keeps the roller 27" in contact with the cam 28.

The carriage 5 furthermore is provided with a pin 29 which when the carriage reaches the end of its travel in either direction is adapted to engage an inclined surface 30' (see Fig. 4) located at each end portion of a bar 30 extending parallel to the carriage path and rigidly secured at both ends to levers 32 fulcrumed on the machine frame at 32'. In Fig. 4, which is a plan view, the arrow indicates the direction in which the carriage moves. One of the levers 32 also carries a pivoted pawl 31 which a spring 31' keeps in engagement with ratchet teeth 25' on the platen 25, said pawl operating to turn the platen the distance of one line as explained below. The lower end of each lever 32 is pivotally connected at 32" with a bar 33 extending transversely of the carriage path and pulled upwardly by a spring 33'. Each of the said bars 33 carries a feed pawl 34 engaging rack teeth on a slide 35 movable on the frame of the machine in a direction transverse to the carriage path. Adjacent to each feed pawl 34, a retaining pawl 36 fulcrumed on the frame of the machine at 36' also normally engages the rack teeth of the slide 35. Each of the bars 33 is provided with a pin 33" in the path of the respective pawl 36 so that if the pawl 36 is rocked clockwise in Fig. 2 to a sufficient extent, both pawls 36 and 34 will be thrown clear of the rack teeth. A spring 35' tends to pull the slide 35 toward the right, to the position shown in Fig. 2. In the embodiment illustrated, the slide 35 has four rack teeth or rather four tooth spaces to be engaged successively by the feed pawl 34. In the initial position of the slide 35 (Fig. 2), if the card is in the scanning position 1', a particular line of the card, the first scanning line, is in the scanning position, the right-hand edge of the card being in contact with the slide as shown. By successive stepwise movements of the slide toward the left, the card 1' will be shifted progressively, by the space or height of a line, to bring its second, third and fourth line respectively into the scanning position. When the fourth line is in the scanning position, the card has reached the storing position indicated at 1". This scanning of four successive lines corresponds to the use of cards having a record or other matter arranged in four lines, as in Figs. 5 and 13; it will be obvious that the number of rack teeth or tooth spaces on the slide 35 may be greater or less than four, according to the number of lines to be scanned.

The shaft 28' and the cam 28 carried thereby are rotated from the motor shaft 14 by intermediate gearing indicated at 37, 38, 39 and 40. On the gear wheel 40 is mounted a roller 41 adapted to impart intermittent rotation to a toothed wheel 42 journaled in the frame of the machine. The teeth of said wheel 42 are provided with recesses 43 adapted to receive pins such as 44 projecting beyond such teeth. In Fig. 1, I have shown pins 44 on every other tooth of the wheel 42; in other words, since I have illustrated this wheel as provided with eight teeth, it would, in this particular case, carry four equidistant pins 44. The number of pins employed would vary in accordance with the number of scanning lines, as explained below. A lever 45 fulcrumed on the frame of the machine at 45' has an inclined upper face which clears the path of the teeth of wheel 42 but projects into the path of a pin 44 which may have been inserted in any tooth of said wheel. This lever 45 is provided with a hook 45" which normally extends into the path of a pin 46 on a link or bar 47 which at one end has a pin-and-slot connection 47' with the lever 27, and at its other end has a pivotal connection 47" with a lever 49 fulcrumed on the frame of the machine at 49' and having at its free upper end a pin-and-slot connection 49" with the feed device 3. A spring 48 tends to pull the lever 49 in such a direction as to move the feed device from right to left in Fig. 1. On the fulcrum 45' is secured rigidly not only the lever 45 mentioned above, but another lever 45 which differs from the one first described in that it lacks the inclined face and the hook 45''. Each of the two levers 45 is operatively connected with the respective pawl 36 by a link 45a, and a spring 45b tends to hold these parts in their normal position.

The platen and ribbon mechanism may be of any suitable type, and at 50 I have shown projections on the slide 18 to operate a ribbon feed mechanism such as indicated in Fig. 1; inasmuch as ribbon feed mechanisms of this character are well known in typewriting machines, detailed description thereof is deemed unnecessary.

The operation is as follows: Let us assume that the motor 15 has been started, say by closing a switch (not shown). The resulting rotation of cam 28 will rock the lever 27 and thus move the carriage 5 to and fro. This movement will indeed impart a line-spacing movement to the platen 25, and also shift the slide 35 stepwise toward the left, in the manner more fully set forth hereinafter. However, since no card is in the scanning position I', such movement of the slide 35 will have no effect at this time. At the same time, the rotation of wheel 40 will impart a stepwise partial rotation to the wheel 42. The scanning operation, however, will not begin until a card has been brought into the scanning position. This happens when the rotation of wheel 42 brings a pin 44 against the inclined face of the lever 45, to rock said lever, contraclockwise in Fig. 2. This will have two results: First, the links 45a will move upwardly and thereby swing the retaining pawls 36 and the feed pawls 34 into the releasing position, allowing the spring 35' to restore the slide 35 to the initial position shown in Fig. 2. Second, the hook 45'' on the lever 45 will be removed from the path of the pin 46. The bar 47, which so far has been held stationary owing to the hook 45'' blocking the pin 46, will then be allowed to move toward the left in Fig. 1, under the influence of the spring 48 acting on the lever 49. The lever 49 will thus be allowed to swing toward the left in Fig. 1, to the extent permitted by the pin-and-slot connection 47'. This movement of the lever 49 will operate the feed device 3 to move the uppermost card I from the magazine to the scanning position I', in readiness for the scanning operation. The bar 47 and the parts 49, 3 connected therewith will be restored to the position shown in Fig. 1, during the next swing of the lever 27 toward the right, the hook 45'' having an inclined face which allows it to yield slightly so that the pin 46 may pass from the left of the hook 45'' to the right thereof, the spring 45b permitting such movement. Let us assume that a card has been brought to the position I', which may be termed the scanning position, and that one line of said card, say the upper line, is in the path of the beam or ray of light which the lens system 6' projects on a portion of the card. (For the sake of greater clearness, Fig. 1 shows the paper P in a position in which the third line is about to be copied, but in reality, under the conditions just assumed, no letters would appear as yet on the paper, and the portion of the paper adapted to receive the copy of the first line would be at the level of the stylus 21.) The parts of the mechanism are initially in the position illustrated by Figs. 1 and 2. As the cam 28 continues to rotate, the action of said cam on the lever 27 moves the carriage 5 from left to right in Fig. 1, lengthwise of the line of writing which is in registry with the beam of light. Simultaneously with the travel of the carriage in said direction at a relatively low speed, a relatively rapid rotation is imparted by the belt 13 to the shaft 12 and through it to the screen 9 and to the eccentric 16. From the particular portion of the line which is illuminated by the beam of light, a beam is reflected upwardly through the lens 7, said reflected beam being directed on to the screen 10, but it will be understood that only such portion of the beam as strikes the slit or window 11 can pass through said screen. The height a of the window 11, measured in a direction parallel to the shaft 12 and therefore perpendicular to the movement of the carriage 5, is equal to, or slightly exceeds, the height of the line of writing. That portion of the light which passes through the window 11, reaches the revolving screen 9, in a beam the position of which corresponds to that of the window 11, that is to say, a beam which is oblique with reference to the longitudinal axis of the screen 9. It follows that only a small portion of said beam can pass through the window or slit 9' of the screen 9 and thus reach the photoelectric cell 8. As the screen 9 is rotated, different points of the beam passing through the window 11 will come into operative relation to different points of the window 9', and at the same time the movement of the carriage 5 will cause the light from the source 6 to strike different portions of the line which is being scanned at that time. As a result of the double motion consisting of the longitudinal movement of the carriage 5 and screens 9 and 10 and of the rotary movement of the screen 9, the characters found in the particular line of the card will be scanned along a sinuous line of the same character as the one indicated by the dotted line b in Fig. 6. It will be noted that this dotted line has oblique parallel portions which are inclined at the same angle c that the longitudinal axis of the window 11 forms with a line d perpendicular to the travel of the carriage 5. Inasmuch as the upstrokes of the letters on the card I are generally vertical, the sinuous scanning line will intersect each vertical upstroke in a plurality of points, in the same manner as illustrated in Fig. 6 with reference to the letter P.

As long as the beam of light reaching the photoelectric cell 8 has its full strength, that is to say, as long as such beam is reflected by a white or clear portion of the card 1, the current energizing the magnet 23 has its full strength, and the stylus 21 is in the retracted position shown in Fig. 2. The circuit which includes the coil of the electromagnet 23 is as follows: positive pole of the battery B, coil of electromagnet 23, frame of carriage 5, photoelectric cell 8, and negative pole of battery B. Whenever the beam of light reaching the photoelectric cell 8 comes from a dark point of the line, that is to say, a point at which the sinuous scanning line intersects a stroke of one of the letters or other characters, the photoelectric cell 8 is affected in such a manner as to weaken the current flowing through the coil of the electromagnet 23. This weakening of the current reduces the strength of the electromagnet and enables the spring 20 to pull the armature 22 away from said magnet, thus throwing the stylus 21 toward the platen 25 so that an impression may be made on the paper P through the ribbon 24. The stylus 21, however, does not remain in contact with the ribbon 24, which action would be objectionable as it might tear the ribbon; but before the point of the stylus reaches the ribbon 24, the contact 20' engages the screw 26; owing to the elasticity of the spring 20, however, the upper portion of said spring and the stylus 21 continue their movement toward the left in Fig. 2 for a short time even after the contact 20' has engaged the screw 26, this additional movement enabling the stylus to strike the ribbon 24 and to produce a point impression on the paper. When the contact 20' engages the screw 26, the full strength of the battery B energizes the magnet 23 through the following circuit: positive pole of battery B, coil of electromagnet 23, frame of carriage 5, spring 20, contact 20', screw 26, and negative pole of battery B. The magnet will thus again attract the armature 22 and draw the parts back to the position shown in Fig. 2. The point of the stylus 21 is given, by the longitudinal motion of the carriage 5 and the reciprocating motion of the slide 18, a motion relatively to the platen along a sinuous path such as indicated at b in Fig. 6, which path is of a character similar to the sinuous line referred to above in the description of the scanning operation. As a result of this, any letter or character found in the particular line of the card in the scanning position, will be reproduced on the paper P by a series of points, in the manner illustrated on an enlarged scale in Fig. 6. If the angle at which the stylus reciprocates is the same as the angle c referred to with the scanning operation, the characters of the copy will be of the same shape as those of the original, that is to say, any line vertical in the original will be reproduced by a vertical series of points in the copy, as shown in Fig. 6, Fig. 1 indicating c as the angle at which the stylus 21 reciprocates. It is, however, not essential to the invention that the stylus reciprocate in an oblique path at the same angle as the "scanning path" angle c.

During motion of the carriage from left to right in Fig. 1, the entire line on the card will have been scanned and reproduced on the paper P. As the carriage reaches the end of its travel to the right, the pin 29 engages the inclined face 30' at one end of the bar 30 (see Fig. 4) and thereby rocks the levers 32 in a contraclockwise direction in Fig. 2. This rocking of the levers 32 controls a line-spacing operation, both with respect to the platen 25 and with respect to the card 1'. As the levers 32 rock in the direction indicated, the pawl 31 is carried toward the left in Fig. 2 so as to engage the next notch of the ratchet 25'. At the same time the bars 33 with their pawls 34 move toward the right so as to carry said pawls into the next (second) notch of the rack on the slide 35. When during the subsequent return movement of the carriage (from right to left in Fig. 1 under the influence of the spring 27a) the pin 29 comes out of contact with the said inclined face 30' on the bar 30, the spring 31' pulls the pawl 31 and with it the levers 32 back to the position shown in Fig. 2. This return swing of the levers 32 causes the pawl 31 to give a partial turn to the platen 25, to effect line spacing, and also causes the pawls 34 to move the slide 35 toward the left so as to carry the card 1' to the left by an amount such as required to bring the next line of the card into scanning position. The pawls 36 yield during the movement of the slide 35 toward the left, but normally hold such slide against movement toward the right. During the return movement of the carriage from right to left, the next (second) line of the card 1' will be scanned and reproduced in the same manner as described above with reference to the first line. At the end of this return movement, the pin 29 will come in contact with the inclined face 30' at the other (left-hand) end of the bar 30 and thus gives another line-spacing feed both to the platen 25 and to the card-shifting slide 35, in the same manner as described above. The provision of inclined faces 30' at each end of the bar 30 is of the same character as illustrated in Fig. 14 with reference to another embodiment of my invention, where 130' designates the inclined faces at both ends of the bar 130, co-operating with the carriage pin 129.

At each rotation of the shaft 28', the roller 41 comes into engagement once with a tooth on the wheel 42 and advances said wheel by one tooth. The wheel 42 is therefore given a partial rotation amounting to the distance between two of its teeth, after the scanning of each two lines of the card 1'. It will be understood that the teeth of the wheel 42 themselves have no action on the lever 45, that is to say, if the pin 44 were omitted, the wheel 42 would rotate without any effect. After the wheel 42 has moved contraclockwise two steps or partial rotations from the position shown in Fig. 1, four lines of the card 1' will have been scanned, and reproduced on the paper P. The cam 28 is of such a shape that the lever 27 and the carriage 5 will remain stationary, or practically so, for a short time at each end of their travel. At a moment when the carriage is thus stationary, the continued rotation of the wheel 42 will bring another pin 44 against the inclined face of lever 45 and rock such lever downwardly. As has been explained above, such downward movement of the lever 45 will release the slide 35 from the pawls 34 and 36, permitting the spring 35' to restore the said slide to its initial position. At the same time, as likewise explained above, the lever 49 will swing toward the left in Fig. 1, under the influence of the spring 48, and will operate the feed device 3 in the same direction. The feed device will thus push the uppermost card 1 from the magazine toward the left, to the scanning position shown at 1', such card slipping over the top of the previously scanned card, which is in the position 1". The carriage 5 will then resume its travel.

I have described in detail the operation as it will take pace if a new card is fed after four lines have been scanned. If it were desired to feed a new card from the magazine after the scanning of two lines, the only change required would be the addition of pins 44 in the other recesses 43 of the wheel 42, so that each tooth of said wheel would carry a pin 44. It would thus be possible to copy cards bearing only two lines of reading matter, or, if the cards had more than two lines of such matter, only the first two lines would be copied. This partial copying of cards might be useful in some cases, for instance if it is desired to copy only the names and addresses from cards such as exemplified by Figs. 5 and 13. Similarly, the machine illustrated might be employed for copying eight or sixteen lines from the same card; in the first of these cases, I would use only two pins 44, in recesses 43 of two diametrically opposed teeth of the wheel 42; in the second case, a single pin 44 would be employed. In both of these cases, the slide 35 would differ from the one shown in Fig. 2 by having a greater number of teeth on its rack portion, the number of tooth spaces corresponding to the maximum number of lines to be scanned on the card. It will further be evident that the results may also be varied by employing wheels 42 having more or less than eight teeth.

In the construction so far described, the entries found on individual cards are transferred to a single sheet of paper or like material. In some cases it may be desirable to effect the opposite operation, that is to say, to transfer entries found upon a continuous sheet or band of paper, successively to individual cards. Such a construction is indicated in Fig. 7. In this Fig. 7, which is a view similar to Fig. 2, the parts designated by numerals with the suffix x are the same in function as the parts which in Fig. 2 bear the same numerals without a suffix. The parts which are not shown in Fig. 7 and which are necessary to complete the machine, may be of the same character as in Figs. 1 and 2. It will be understood that these parts would include a wheel 42 and a pin 44, or a plurality of such pins, inserted in one or more of the sockets 43 on the wheel 42, as explained above. Thus the machine of Fig. 7 will have the same capability as the one first described, of enabling an entry to be copied either entirely or only in part, as the user may select, and will also copy entries having different numbers of lines, according to the number of teeth on to wheel 42 and on the rack portion of the slide 35, and according to the placing of the pins 44 on said wheel. In Fig. 7 the light source 6x, mounted on the carriage 5x which travels along the guides 5'x, throws the beam of light through the lens system 8'x on to the band or sheet of paper P which engages the platen 25x and is fed for line spacing by the pawl 31x in the same manner as described in connection with Figs. 1 and 2. The light reflected from the sheet of paper passes through the lens 7x and reaches the photoelectric cell 8x through the windows or slits 11x and 9'x of the screen 10x and the rotary screen 9x respectively. The belt 13x does not drive the shaft 12x of the screen 9x directly, but through the medium of a shaft 51 and gearing 52. The slide 35x effects the line spacing of the card 1x relatively to the stylus 21x, said slide being controlled by the rod 33x, from the rocking lever 32x, in the same manner as described in connection with Figs. 1 and 2. The electrical connections of the photoelectric cell, the magnet 23x, the carriage frame and the parts 20'x, 26x are to be of the same character as in Figs. 1 and 2 and therefore need not be described in detail.

In Figs. 8 to 12 and 14 I have shown an embodiment of my invention which has special advantages and which in particular enables the items found upon an original, for instance a card such as shown in Fig. 13, to be reproduced upon the copy, such as a web or sheet of paper P, not only in their original order, but in any other desired order. Many parts of the machine illustrated by Figs. 8 to 12 and 14 are of the same function and substantially the same arrangement as in Figs. 1 to 4, and these parts have been designated by numerals which are greater by 100 than those in Figs. 1 to 4. No detailed description of these similar parts will therefore be required. It will be understood that the wheel 142 (Fig. 8) will be of the same character as the wheel 42 of Fig. 1, that is, its teeth will have sockets to receive pins such as 144, with the same possibilities of varying the operation as explained with reference to Figs. 1 to 6. The mechanism for moving the carriage 105 longitudinally is somewhat different from the one shown in the construction first described. A pinion 60 journalled on the frame of the machine meshes with a toothed sector 127' on the lever 127 and also with a rack 61 on the carriage 105 moving along the guides 105'. On this carriage is mounted the platen 125 to which is secured rigidly a toothed wheel 162 in mesh with another toothed wheel 63 held to move with the carriage. This wheel 63 is fitted to slide lengthwise upon a shaft 64 journalled in the frame on the machine. This shaft does not share the lengthwise movement of the carriage, but as the carriage moves, the toothed wheel 63 will slide along the shaft. However, the shaft and wheel are of such formation as to compel them to rotate in unison. On the shaft 64 is secured rigidly a ratchet wheel 125' co-operating with the pawl 131 to effect the line spacing of the platen in the same manner as described in connection with Figs. 1 to 4. The pawl 131 is controlled by the bar 130 co-operating with the pin 129 on the carriage 105 in the same manner as described in connection with the first form of my invention. It will be noted that many of the parts which in Figs. 1 to 4 slide with the carriage, are carried by the frame in Figs. 8 to 12 and do not partake of the longitudinal movement of the carriage; this applies particularly to the light source 106, the optical system 106', 107, and the photoelectric cell 108, which in this form of my invention are stationary. The photoelectric cell 108 is contained in a casing 65 in which is movable an opaque band or film 66 (which may be an endless band) having apertures 67 or windows pervious to light, one run of said band passing between the lens 107 and the photoelectric cell 108 so as to control the rays of light reaching said cell; the other run of the band is suitably guided, for instance by rolls 67'. The band has edge apertures 66' of the character customary in moving picture films, to co-operate with projections 68' on a rotary feed member or sprocket 68 carried by a shaft 69 receiving motion from the motor shaft 114 through bevel gears 70, a vertical shaft 71, bevel gears 72, a horizontal shaft 73, and bevel gears 74. To the shaft 71 is secured rigidly a distributor 75 having a plurality of contact blades. These blades are adapted to engage, on one side, a stationary contact blade or sector 76, and on the other side of the shaft, a plurality of stationary contacts 77. The relative location of these contacts 76, 77 and of the blades of the distributor 75, is such that while one blade sweeps into successive engagement with the contacts 77, another blade remains in engagement with the contact 76. The contacts 77 are each connected with one end of the coil of an electromagnet 123, the other ends of said coils being connected with one output terminal of an amplifier 78; the other output terminal of said amplifier is connected with the contact 76. At B' I have indicated a battery or other source supplying current to the amplifier. In this embodiment of my invention, the amplifier should be of the type which delivers an increased current at the output terminals when the input current decreases, and vice versa; a two-tube amplifier is suitable for this purpose. The input terminals of the amplifier are connected with the terminals of the photoelectric cell 108 as indicated in the diagram Fig. 9. The construction illustrated employs six electromagnets 123 with their contacts 77. Each of the magnets 123 controls an armature 122 which by a link 79 is connected with a pawl 80 fulcrumed at 80' and normally drawn away from the corresponding magnet by a spring 81. This pawl is adapted to lock in the inactive position shown in Fig. 11, a hammer or stylus 82 fulcrumed at 82′ and urged toward the ribbon 124 and the platen 125, by a spring 83. Such hammer or stylus constitutes a marking device. Whenever one of the magnets 123 is energized, the corresponding pawl 80 is swung in such a direction as to release the corresponding hammer or stylus 82. Such hammer, however, is not at once thrown against the ribbon 124 and the platen 125, but is arrested, after a short partial movement, by the engagement of a projection 82″ on the hammer with the peripheral surface of a notched wheel or drum 84 mounted rigidly on the shaft 71. Only when the rotation of the wheel 84 brings one of its notches into registry with the projections 82″ of those hammers 82 which have been previously released, will the springs 83 of said hammers be able to throw them, simultaneously, to the striking or impression-making position.

The operation is as follows: It will be noted that the film 66 travels transversely of the card lines. The cards generally have columns or divisions each intended to receive specific data. Thus, for instance, the card shown in Fig. 13 has in its first line a division for the Christian or given name of a person, another division for the surname, and a third division for the name of the city in which the person resides. To each such division of the card line corresponds a certain group of apertures 67 in the film 66, and the width of such group, measured transversely of the film, corresponds to the width of the respective card line division. The particular film illustrated by Fig. 13 has the group I, which controls the copying of the surname, arranged ahead of the group II, which controls the copying of the given name, so that in copying the first line of the card, the name appearing on the card as Paul Smith will be reproduced on the sheet of paper P as Smith Paul, since in many cases it is desirable to have the surname precede the given name, as when making a list of persons with their surnames arranged in alphabetical order. A certain definite number of successive apertures 67 (for instance, seven such apertures) are adapted, during the scanning operation, to sweep a card portion corresponding to the width of a character or rather character-space in the respective card line. The individual character-spaces in a card line are of equal width in this case. Each aperture 67 scans the card along a different vertical line, and all the points of a character which lie in the same vertical are scanned by the same aperture 67. While one of the apertures 67 sweeps one of the character-spaces, it passes through a definite number (for instance six) of analyzing positions; thus, as an example, an aperture 67 would pass through six successive analyzing positions while sweeping through the height of a character-space, say while scanning along the line of the vertical stroke of the P in Paul. The number of electromagnets 123 and their adjuncts agrees with, or corresponds to, this definite number of analyzing positions of each aperture 67. Thus, in the particular case under discussion, there are six electromagnets 123, corresponding to the six analyzing positions of an aperture 67. The height of a character need not be the same with respect to each character of the card; for instance, such height might correspond to six analyzing positions with respect to the numerals shown in Fig. 13, and to five analyzing positions with respect to the letters. In any event, the height of a character should not exceed the dimension corresponding to the distance swept by one of the apertures 67 while passing through all its (six) successive analyzing positions. The total number of apertures in each group is relatively large, and will generally be an entire multiple of the number of apertures corresponding to the width of a character-space. When, as assumed above, seven apertures 67 will sweep the width of a character-space, the number of apertures in each group would generally be a multiple of 7. The film or band 66 would contain as many groups of apertures 67 as required for the desired operation.

Let us assume that the first aperture 67 in group II has just reached the scanning position, that is to say, the position in which it permits light from a certain point in the card line to reach the photoelectric cell 108. At that time, with the particular card shown in Fig. 13, the vertical stroke of the P in Paul will be in the scanning position. This dark portion of the letter P will therefore cut down the luminous power of the ray as long as the said first aperture 67 of group II is in scanning relation to the first stroke of the P, that is to say, during five of the six analyzing positions of said aperture (in view of the fact that the height of the letters has been assumed as corresponding to five analyzing positions). While this is the case, the photoelectric cell 108 will be affected correspondingly, so that the current reaching any of the magnets 123 from the amplifier 78 will be increased sufficiently to release the respective hammer or stylus 82 from the holding pawl 80. The relative speed of the parts of the machine is such that during the time required by the film to carry one of the apertures 67 through its scanning field (that is, the time required to bring the next aperture 67 to a corresponding scanning position), the distributor 75 will receive a partial rotation, with one of its blades remaining in engagement with contact 76, sufficient to bring another of its blades into successive engagement with each of the six contacts 77. In the particular case of scanning the vertical stroke of the letter P, five of the six electromagnets 123 will therefore receive a strengthened current so that the corresponding five hammers 82 will be released successively as each of the contacts 77 is engaged by the rotating distributor blade. If the hammers were allowed to strike the paper at once, they would (since their release from the pawls 80 is successive) reproduce the originally vertical stroke of the P in a distorted (inclined) position. While this may be unobjectionable in some cases, I prefer to insure the vertical reproduction of the originally vertical strokes. For this purpose, I have provided the wheel or drum 84, which prevents the hammers 82, even when released from the pawls 80, from being projected into the striking position until the projections 82″ of all six hammers register with a notch of said wheel and thus all hammers previously released from their pawls 80 will strike the paper together instead of successively. One revolution of said drum 84 corresponds to two character-spaces, and the number of the notches on the drum is equal to that of the blades of the distributor 75. In the particular embodiment illustrated, one-fourteenth of a revolution of the shaft 71 will bring the next notch of the drum 84 into registry with the projections 82″ of the hammers 82; this one-fourteenth of a revolution of the shaft 71 also corresponds to the period during which one of the apertures or windows 67 passes through the scanning field, that is to say, through all the (six) successive analyzing positions. The other features of operation, such as line-shifting on platen and of the card being scanned, will be understood readily without any further explanation, as they are substantially the same as described in connection with the first form of my invention.

It will be evident from Fig. 12 that according to the arrangement of the several groups such as I, II, III, the data found in a line of the card may be reproduced either in the same order or in any other order desired. It is even possible with my invention to combine into a line of the copy, data or elements taken from different lines of the original cards. It will be noted from Fig. 10 that the fulcrum 132' of the levers 132 is nearer to the pawl 131 than to the bars 133, so that rocking the lever 132 through a relatively small angle may be sufficient to operate the slide 135 for the line-feed of the card, but insufficient to give a line-spacing movement to the platen 125. In order to accomplish this result, the bar 130 may be provided, at points between its ends, with projections 130" (Fig. 14) which are smaller than the projections 130' which, at each end of the carriage travel, rock the bar 130 sufficiently to operate both the line-spacing of the platen and the line-feed of the card. The intermediate projections 130", being smaller, will rock the bar 130 only sufficiently to operate the line-feed of the card, but not enough to impart a line-spacing movement to the platen. According to the position and number of the small intermediate projections 130", different portions may be selected from different lines of the original (the card) for reproduction in one line of the copy, in any desired order.

By a proper arrangement of the scanning apertures or windows 67 in the film 66, it is of course also possible to copy only selected portions of the card, omitting others entirely, so that the copy will, as it were, constitute an abstract of certain data or information found on the card.

It will be understood that the film or band 66 may be exchanged for others having a different arrangement of windows or apertures 67. It will be noted that in the embodiment illustrated the striking heads or portions of all (six) hammers 82 are in alignment circumferentially of the platen. It will further be understood that whatever elements and connections necessary to the operation are not illustrated fully, or not at all, in connection with this form of my invention, may be of the same type as illustrated and described with reference to the construction shown in Figs. 1 to 4.

An amplifier might also be used, if desired, in a construction of the type illustrated by Figs. 1 to 4 (or 7). In this case, the amplifier would have to be of the type in which a decrease of input current is accompanied by an increase in output current; a one-tube amplifier would have this effect. The electrical connections in this case would be, for instance, as indicated in the diagram Fig. 15. The output terminals of the amplifier 78' would be connected with the ends of the coil of the electromagnet 23, and the input terminals with the terminals of the photoelectric cell 8. In addition, one of the input terminals would also be connected with the screw 26, and the other with the frame of the carriage 5 and through it with the contact 28'. The effect of the intermittent darkening of the cell 8 on the operation of the armature 22 (connected with the stylus or striker 21) will be substantially of the same character as described in connection with Figs. 1 to 4. B" designates the battery or other source of electricity used in connection with the amplifier 78'.

In the embodiments illustrated, I have shown the characters of the original as dark upon a white or at least relatively lighter background. It will be obvious that these relations might be reversed, that is to say, the original might have light-colored characters on a dark background. As a matter of fact, it is simply necessary that the characters of the original should affect the particular rays employed (which might be others than luminous rays) in a manner different from the background.

Various modifications may be made without departing from the nature of my invention as defined in the appended claims. Where in such claims I use the expression "copy-holding section," I mean a section for holding material (such as the paper P in Figs. 1, 2, 8, and 10, or the cards 1x in Fig. 7) on which copies of the originals are to be produced.

I claim:

1. In a machine of the kind described, two elements, viz.: a frame carrying a holder for an original, and a carriage movable relatively to said frame, a copying device proper composed of a copy-producing section and a section for holding material on which a copy of said original is to be produced, one of said sections being carried by said frame and the other by said carriage, so that such last-mentioned section will be shifted relatively to the other by the movement of the carriage, a scanning device carried by the same element as the said copy-producing section in a position to co-operate with an original on said holder, and means controlled by said scanning device, for operating said copy-producing section.

2. In a machine of the kind described, a holder for an original, a copying device proper composed of a copy-producing section and a section for holding material on which a copy of said original is to be produced, one of said sections being in fixed relation to said original-holder, a carriage movable relatively to said holder and carrying the other section of said copying device, a scanning device in fixed relation to one of the sections of said copying device, in a position to co-operate with an original on said holder, and means, controlled by said scanning device, for operating said copy-producing section.

3. In a machine of the kind described, a frame, said frame carrying a holder for a number of originals, a copying device proper composed of a copy-producing section and a section for holding material on which copies of said originals are to be produced, a carriage movable relatively to said frame and carrying one of said sections to shift such section relatively to the other section of said device by the movement of carriage, a scanning device supported by said frame, means to remove the originals from said holder and to successively present them to the scanning device, and means controlled by said scanning device for operating said copy-producing section.

4. In a machine of the kind described, a ray-sensitive device arranged to receive rays of radiant energy from a member bearing characters of ray-modifying properties in different fields thereof, reproducing means controlled by said device for making a copy of the characters of the different fields of the member, and means for rearranging the fields during their reproduction so that the order of the fields in the copy will be different from their order on said member.

5. In a machine of the kind described, a ray-sensitive device arranged to receive rays of radiant energy from a member bearing characters of ray-modifying properties, means, controlled by said device, for reproducing characters from said member, said means including scanning means and means for changing the order in which the characters are reproduced from the order in which they appear on said member.

6. A method of scanning an object which consists in successively scanning sections of the object in a sequence which differs from the order of said sections on said object.

7. A method of scanning and reproducing an object which consists in scanning sections of the object and reproducing them in a relative arrangement which differs from the arrangement of said sections on said object.

8. In a machine of the kind described, a holder for an original, a copying device proper composed of a copy-holding section and a copy-producing section, a carriage movable relatively to said holder and carrying one of said sections to shift such section relatively to the other section of said device by the movement of the carriage, a ray-sensitive device and a scanning device in positions to co-operate with an original on said holder, an operative connection from said ray-sensitive device to said copy-producing section, means for producing simultaneously a line-spacing operation at the copy-holding section and at the original-holder, and means for producing a line-spacing operation only at the copy-holding section between successive line-spacing operations effected simultaneously at the copy-holding section and at the original-holder.

9. In a machine of the kind described, a holder for an original, a copying device proper composed of a copy-holding section and a copy-producing section, a carriage movable relatively to said holder and carrying one of said sections to shift such section relatively to the other section of said device by the movement of the carriage, a ray-sensitive device and a scanning device in positions to co-operate with an original on said holder, an operative connection from said ray-sensitive device to said copy-producing section, a movable bar provided with relatively large projections adapted to be engaged by a projection of the carriage at each end of the carriage movement to impart a relatively large movement to said bar, such bar also having one or more intermediate relatively small projections likewise adapted to be engaged by said projection on the carriage, to impart a relatively small movement to said bar, and an operative connection from said bar to said copy-holding section and to said original-holder, for producing a line-spacing operation only at the copy-holding section by said relatively small movement of said bar, while such relatively large movement of said bar will produce a line-spacing operation both at the copy-holding section and at the original-holder.

10. In a machine of the kind described, a holder for an original, a copying device proper composed of a copy-holding section and a copy-producing section, a carriage movable relatively to said holder and carrying one of said sections to shift such section relatively to the other section of said device by the movement of the carriage, a ray-sensitive device and a scanning device in positions to co-operate with an original on said holder, said scanning device comprising a longitudinally movable member provided with scanning windows arranged in groups, each group being out of registry with the other groups both lengthwise and transversely of said member, and the order of said groups in the transverse direction being different from their order in the lengthwise direction, and an operative connection from said ray-sensitive device to said copy-producing section.

11. In a machine of the kind described, a holder for an original, a copying device proper composed of a copy-holding section and a copy-producing section, a carriage movable relatively to said holder and carrying one of said sections to shift such section relatively to the other section of said device by the movement of the carriage, a ray-sensitive device and a scanning device in positions to co-operate with an original on said holder, said scanning device comprising a movable member provided with scanning windows arranged in groups, each group being out of registry with the other groups both lengthwise of the direction of movement of said member and transversely thereof, and the order of said groups in the transverse direction being different from their order in the other direction, and an operative connection from said ray-sensitive device to said copy-producing section.

12. In a machine of the kind described, a holder for an original, a copying device proper composed of a copy-holding section and a copy-producing section, said last-mentioned section including a plurality of marking hammers movable toward and from the copy-holding section, individual holding means for normally keeping said hammers in their inactive position, a carriage movable relatively to said original-holder and carrying one of said sections of the copying device to shift such section relatively to the other section of said device by the movement of the carriage, a ray-sensitive device and a scanning device in positions to co-operate with an original on said holder, and an operative connection from said ray-sensitive device to said hammer-holding means, to control the release of the hammers from their holding means, said connection including means, operated in conjunction with the movement of the carriage, for releasing the hammers successively from their said holding means, and also including means, likewise operated in conjunction with the movement of the carriage, for temporarily holding the successively released hammers in their inactive position and then releasing them simultaneously for their marking action.

13. In a machine of the kind described, a holder for an original, a copying device proper composed of a copy-holding section and a copy-producing section, said last-mentioned section including a plurality of marking hammers movable toward and from the copy-holding section, individual holding means for normally keeping said hammers in their inactive position, a carriage movable relatively to said original-holder and carrying one of said sections of the copying device to shift such section relatively to the other section of said device by the movement of the carriage, a ray-sensitive device and a scanning device in positions to co-operate with an original on said holder, and an operative connection from said ray-sensitive device to said hammer-holding means, to control the release of the hammers from their holding means.

14. A scanning member for a machine of the kind described, said member being provided with scanning windows arranged in groups, each group being out of registry with the other groups both lengthwise and transversely of said member, and the order of said groups in the transverse direction being different from their order in the lengthwise direction.

15. A scanning member for a machine of the kind described, said member being provided with scanning windows arranged in groups, each group being out of registry with the other groups in two directions at an angle to each other, and the order of said groups in one of said directions being different from their order in the other of said directions.

16. In a machine of the kind described, a holder for an original, a copying device proper composed of a copy-holding section and a copy-producing section, a carriage movable relatively to said holder and carrying one of said sections to shift such section relatively to the other section of said device by the movement of the carriage, a scanning device mounted on said carriage in a position to co-operate with an original on said holder, and means, controlled by said scanning device, for operating said copy-producing section.

17. In a machine of the kind described, a holder for an original, a copying device proper composed of copy-holding section and a copy-producing section, a carriage movable relatively to said holder and carrying one of said sections to shift such section relatively to the other section of said device by the movement of the carriage, a scanning device mounted on said carriage in a position to co-operate with an original on said holder, means, controlled by said scanning device, for operating said copy-producing section, and means for producing simultaneously a line-spacing operation at the copy-holding section and at the original-holder.

18. In a machine of the kind described, a holder for an original, a copying device proper composed of a copy-holding section and a copy-producing section, a carriage movable relatively to said holder and carrying one of said sections to shift such section relatively to the other section of said device by the movement of the carriage, a scanning device mounted on said carriage in a position to co-operate with an original on said holder, means, controlled by said scanning device, for operating said copy-producing section, and means, actuated by the movement of the carriage, for producing a line-spacing operation at the copy-holding section and at the original-holder.

19. In a machine of the kind described, a holder for an original, a copying device proper composed of a copy-holding section and a copy-producing section, a carriage movable relatively to said holder and carrying said copy-producing section, such section including a stylus mounted to reciprocate obliquely with respect to the direction of the carriage movement and in addition thereto movable toward and from the copy-holding section, a ray-sensitive device and a scanning device both mounted on said carriage in positions to co-operate with an original on said holder, means operated in conjunction with the movement of the carriage, for reciprocating said stylus along its oblique path, and an operative connection from said ray-sensitive device to said copy-producing section to control the movement of said stylus toward and from the copy-holding section.

20. In a machine of the kind described, a ray-sensitive device arranged to receive rays of radiant energy from a member bearing characters of ray-modifying properties, reproducing means controlled by said device, and scanning means co-operating with said device and with said member to select, from said member, the characters to be reproduced, the said scanning means including an element located in the path of the rays between the character-bearing member and the ray-sensitive device and stationary relatively to said device but movable relatively to said member, said element having a portion or portions which permit the passage of said rays, and another element interposed between the first-mentioned element and said device and movable relatively to the latter, said second element having ray-permeable portions which co-operate with the said portion or portions of the first-mentioned element to cause rays from different parts of said member to reach said device successively.

21. In a machine of the kind described, a ray-sensitive device arranged to receive rays of radiant energy from a member bearing characters of ray-modifying properties, reproducing means controlled by said device, and scanning means co-operating with said device and with said member to select, from said member, the characters to be reproduced, the said scanning means including an element located in the path of the rays between the character-bearing member and the ray-sensitive device and stationary relatively to said device but movable relatively to said member, said element having a portion or portions which permit the passage of said rays, and another element interposed between the first-mentioned element and said device and rotatable about the latter, said rotatable element having ray-permeable portions which co-operate with the said portions of the first-mentioned element to cause rays from different parts of said member to reach said device successively.

22. In a machine of the kind described, a ray-sensitive device arranged to receive rays of radiant energy from a member bearing characters of ray-modifying properties, reproducing means controlled by said device, and scanning means co-operating with said device and with said member to select, from said member, the characters to be reproduced, the said scanning means including an element located in the path of the rays between the character-bearing member and the ray-sensitive device and stationary relatively to said device, said element having a portion or portions which permit the passage of said rays, and another element interposed between the first-mentioned element and said device and constructed as a flexible opaque band movable relatively to said device and having windows which co-operate with the said portion or portions of the first-mentioned element to cause rays from different parts of said member to reach said device successively.

23. In a copying machine, a device for scanning an original, a copying device controlled by said scanning device, and constructed to reproduce, in line form on the material on which the copy is to be made, matter found on said original, and means, operated by the machine after a predetermined number of lines have been produced on the copy, for stopping the scanning of such original.

24. In a copying machine, a device for scanning an original, a copying device controlled by said scanning device, and constructed to reproduce, in line form on the material on which the copy is to be made, matter found on said original, and means, operated by the machine after a predetermined number of lines have been produced on the copy, for bringing another original into scanning position.

25. In a copying machine, a device for scanning an original, a copying device controlled by said scanning device, and constructed to reproduce, in line form on the material on which the copy is to be made, matter found on said original, and means, operated by the machine after a predetermined number of lines have been produced on the copy, for establishing an operative relation between another original and the scanning device.

26. In a copying machine, a device for scanning an original, a copying device controlled by said scanning device, and constructed to reproduce, in line form on the material on which the copy is to be made, matter found on said original, feeding mechanism for bringing originals successively into scanning position, additional feeding mechanism for bringing successive lines of the said material into copying position, and means, operated by the machine after the production of a predetermined number of lines of copy on said material, for causing the operation of the first-mentioned feeding mechanism so as to bring another original into scanning position.

27. In a copying machine, a device for scanning an original, a copying device controlled by said scanning device, and constructed to reproduce, in line form on the material on which the copy is to be made, matter found on said original, and means, operated by the machine after a predetermined number of lines have been produced on the copy, for establishing an operative relation between another original and the scanning device, said means including a variable connection by the alteration of which the number of lines of the copy on said material can be predetermined selectively.

28. In a copying machine, a device for scanning an original, a copying device controlled by said scanning device, and constructed to reproduce, in line form on the material on which the copy is to be made, matter found on said original, and means, operated by the machine after a predetermined number of lines have been produced on the copy, for establishing an operative relation between another original and the scanning device, said means including a wheel with teeth formed to receive removable pins, and also including mechanism in the path of said pins, to be operated thereby in accordance with the number and position of said pins.

29. In a copying machine, a device for scanning lines of an original successively, a copying device controlled by said scanning device, and means, operated by the machine after the scanning of a predetermined line of an original, for stopping the scanning of such original.

30. In a copying machine, a device for scanning lines of an original successively, a copying device controlled by said scanning device, and means, operated by the machine after the scanning of a predetermined line of an original, for bringing another original into scanning position.

31. In a copying machine, a device for scanning lines of an original successively, a copying device controlled by said scanning device, and means, operated by the machine after the scanning of a predetermined line of an original, for establishing an operative relation between another original and the scanning device.

32. In a copying machine, a scanning device, a copying device controlled by said scanning device, feeding mechanism for bringing originals successively into scanning position, additional feeding mechanism for bringing successive lines of the same original into scanning position, and means, operated by the machine after the scanning of a predetermined number of lines of one original, for causing the operation of the first-mentioned feeding mechanism so as to bring another original into scanning position.

33. In a copying machine, a device for scanning specific sections of an object, means to suppress the scanning of certain of said sections, and a copying device controlled by said scanning device, to reproduce those sections the scanning of which has not been suppressed.

34. In a copying machine, a device for scanning specific sections of an object, a copying device controlled by said scanning device, and means to suppress the action of the copying device with respect to certain of said sections.

35. In a machine of the kind described, a ray-sensitive device arranged to receive rays of radiant energy from a member bearing characters of ray-modifying properties, means, controlled by said device, for reproducing characters from said member, and means for changing the order in which the characters are reproduced from the order in which they appear on said member.

36. In a copying machine, a device for producing a copy in successive lines, a device for scanning an original containing matter in successive lines, an operative connection for controlling said copy-producing device from said scanning device, and means for re-arranging such matter during the copying action so that elements taken from different lines of the original will be combined into a line of the copy.

GUSTAV TAUSCHEK.